(No Model.)
J. G. STAUNTON.
RUNWAY FOR POULTRY HOUSES.
No. 322,075. Patented July 14, 1885.
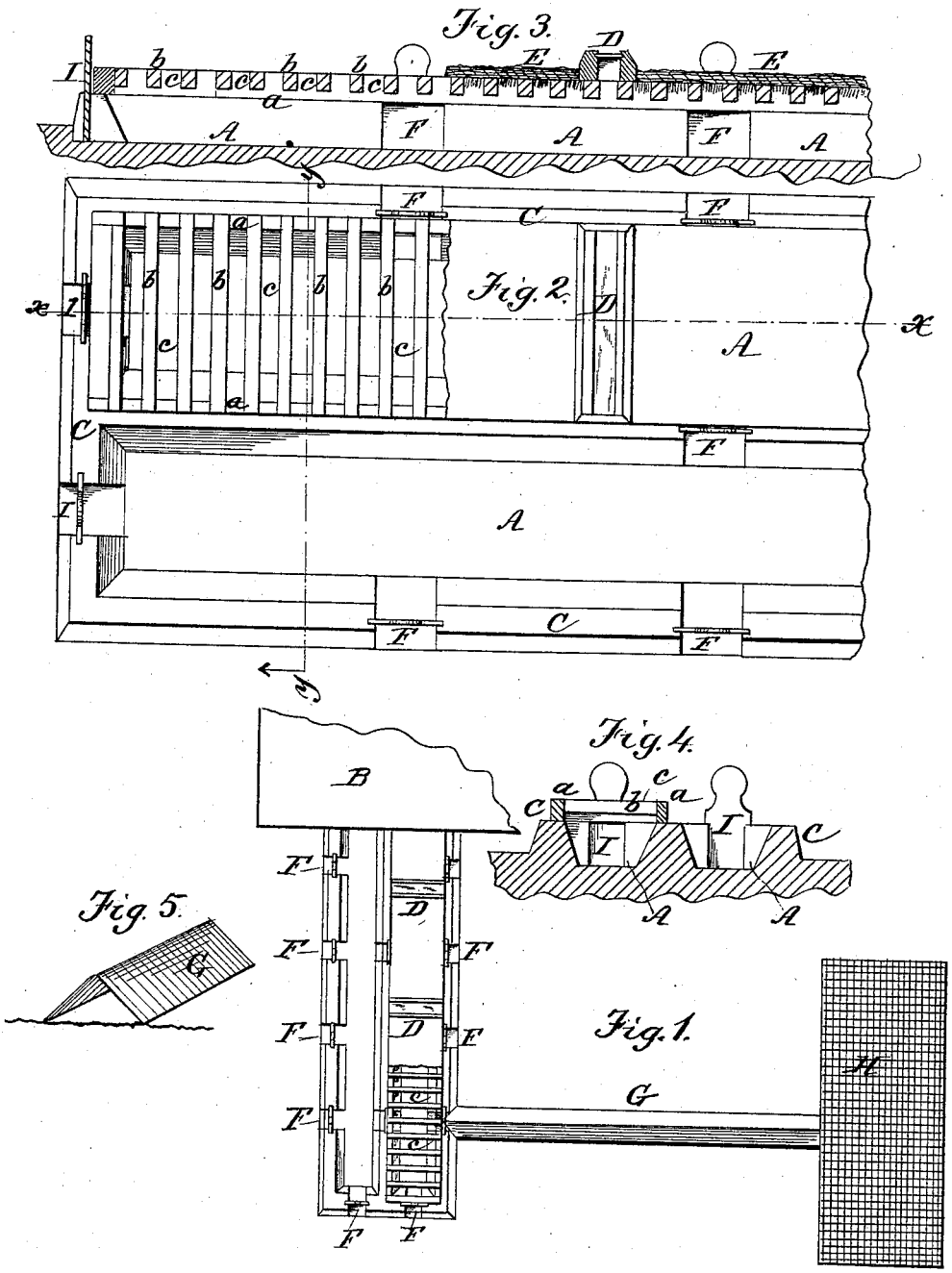

UNITED STATES PATENT OFFICE.

J. GALUSHA STAUNTON, OF ELLICOTTVILLE, NEW YORK.

RUNWAY FOR POULTRY-HOUSES.

SPECIFICATION forming part of Letters Patent No. 322,075, dated July 14, 1885.

Application filed May 19, 1884. (No model.)

*To all whom it may concern:*

Be it known that I, J. GALUSHA STAUNTON, a citizen of the United States, residing at Ellicottville, in the county of Cattaraugus and State of New York, have invented new and useful Improvements in Runways for Poultry-Houses, of which the following is a specification.

My invention has reference to poultry culture; and the objects of my improvement are to provide a more perfect and desirable permanent runway from the poultry-house, and to improve its means of connection with portable runways and creels. These objects I attain by the construction hereinafter described, and shown in the accompanying drawings, in which—

Figure 1 represents in plan view a part of a poultry-house, permanent runway, creel, and portable runway connecting the permanent runway to the creel; Fig. 2, a detail of the permanent runway in plan; Fig. 3, a vertical longitudinal section on the line $x\,x$ of Fig. 2; Fig. 4, a cross-section on the line $y\,y$ of Fig. 2, and Fig 5 the portable runway.

The permanent runway in this instance consists of a ditch, A, leading from the poultry-house B a sufficient distance. This ditch may be two or three feet in width and a few inches in depth, with banks or sides C raised above the general level, of sufficient elevation to give a necessary height from bottom of ditch to top of banked sides for necessary head room for the fowls. The whole surface of ditch—bank, sides, and bottom—is then seeded with grass, clover, or other suitable forage plants, or may be tufted or sodded, and the whole covered with sections of lattice or network $c$, which are preferably constructed of longitudinal strips of lumber $a$, with transverse strips $b$ of lengths to correspond with the width of the ditch A from the top of one side bank to the other, the ends of strips $b$ being either nailed to the longitudinal strips $a$ or inserted in them at suitable distances apart to prevent the escape of the the fowls; or wire-cloth might be nailed on the longitudinal strips. Upon the top of this lattice-work covering or rack-sections $c$, I place at intervals sashed frames of glass D, to admit light to the runway. I cover the lattice-work in the sections between the glass frames D with sods E, or turf cut from along the side of the runway and laid upon the lattice, so that the grass shall be down, thus shutting out wind, rain, and snow and supplying green forage to the fowls.

In summer the runway might be left uncovered, or in winter it might be covered with litter or straw; but the design of the turf is to furnish green forage for the fowls.

The runway has the usual connection with the poultry-house, and has at intervals at the side sliding gates F, to make connection with the portable runway G and the creel H, as shown.

I may, as shown, have one or more ditches, side by side, for the purpose either of running different breeds of fowls from a compartment poultry-house to a compartment-creel or for the purpose of permitting of a new growth of forage in one while the other is being used.

The uses of this permanent runway are to conduct the fowls from the poultry-house to a point in the pasture or poultry-park at any distance therefrom, to admit air and sunshine in the summer, and to furnish forage in winter and sheltered retreat from snow, while admitting light.

In the winter air is admitted to the runway at the end which opens into the poultry-house. It will be understood that the side gateways, F, are used successively, one at a time, and the connecting inclosures are moved along from one to the other at such intervals of time as may be needful to furnish fresh pasture through the whole extent of the permanent runway and alongside of it, such removal connecting with the next gateway while the other would be closed. This is the use of the portable runway during the snowless portion of the year, while the turf cover, skylights, and closed gateways are used in the snows of winter. The permanent runway, however, is a complete device and may be used in winter and summer without reference to connecting inclosures.

When two permanent runways are used, they may be connected by gates in the dividing bank.

Gates are also provided in the ends of the permanent runways, and on each side, so that the gateways can be used for connecting with other inclosures all around the permanent runway.

In Figs. 2 and 3 I have shown the permanent runway partially covered for winter and partially uncovered for the summer; but it will be understood that it will be entirely covered, except the skylights, in the seasons of snow and severe weather.

I claim—

1. A runway for fowls, consisting of a ditch with earthen side banks, a lattice covering, and a roofing of turf having the grass down, substantially as described.

2. A runway for fowls, composed of longitudinal side strips, $a$, and an open covering, substantially as described, a covering of inverted turf, E, sashed lights D at intervals, slide-gates F, for the egress of fowls, and the ditch A, having earth side banks, C, substantially as described.

In testimony whereof I have hereunto set my hand in the presence of two subscribing witnesses.

J. GALUSHA STAUNTON.

Witnesses:
H. L. McCAY,
CHAS. C. RUST.